Nov. 11, 1969   L. H. MOTT   3,477,827
CATALYTIC REACTION DEVICE
Filed July 26, 1966

INVENTOR:
LAMBERT H. MOTT
BY *Peter L. Tailer*
ATTORNEY 3,477,827
CATALYTIC REACTION DEVICE
Lambert H. Mott, Farmington, Conn. (% Mottt Metallurgical Corp., 272 Huyshope Ave., Hartford, Conn. 06114)
Filed July 26, 1966, Ser. No. 567,999
Int. Cl. B01j 7/00, 9/00
U.S. Cl. 23—288                2 Claims

ABSTRACT OF THE DISCLOSURE

A catalytic reaction device has a tubular porous resistance heating element with its ends connected to a current source, an electrically insulated jacket disposed about the tubular element, and means forcing a gas into the jacket to pass inward through the wall of the tubular heating element to flow out at least one end thereof, the tubular element containing an electrically insulated metallic catalyst.

---

This invention relates in general to gas heating devices; and, more particularly, to heaters for gases having electrical resistance heating elements.

A main object of this invention is to provide a porous metal electrical resistance heating element through which a gas is passed to heat the gas. A further object of this invention is to provide a porous metal resistance heating element having a very great internal surface area within its pores to heat a gas passed therethrough.

Another object of this invention is to provide a porous metal resistance heating element, means forcing a gas through said element to heat the gas, a current source connected across said heating element, control means varying the current passing through said heating element, and means responsive to the amount of gas being forced through said heating element connected to said control means varying the current passing through said heating element according to the amount of gas being forced through said heating element.

Yet another object of this invention is to provide a cheaper, lighter, and more efficient ammonia disassociator.

Still another object of this invention is to provide a safer and more efficient air heater for homes.

Many other objects, advantages, and features of invention reside in the fabrication, construction, combination, and arrangement of parts involved in this invention and its practice as will be understood from the following description and accompanying drawing wherein.

Figure 1:
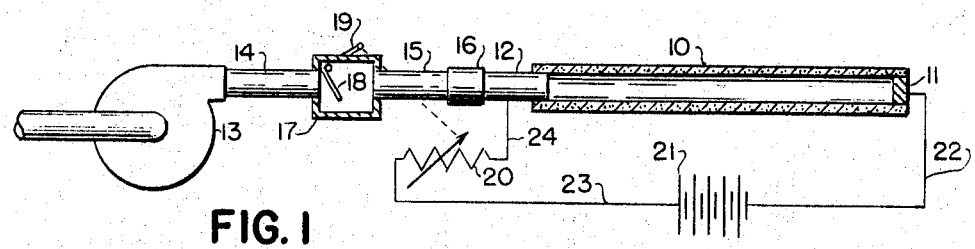
FIGURE 1 is a side view of a resistance heater for a gas according to this invention with a gas flow sensing device and a tubular porous metal heating element shown in longitudinal vertical section.

Referring to the drawing in detail, FIGURE 1 shows a tubular porous metal resistance heating element designated by the reference numeral 10. Element 10 may be made by forming a powder of grains of the well known resistance heating alloy of 80% nickel and 20% chromium. Depending on the use of the heating element, the powder may be of any grain size from the finest to the coarsest used in well known techniques of powdered metallurgy. This powder is then formed into a tubular shape by compacting it about a core to a desired porosity with a suitable binder as is well known. The core is removed and the resulting tubular element is sintered at a temperature of from 2300° F. to 2400° F. to form a tubular porous metal resistance heating element 10. A solid plug 11 of electrically conductive metal is soldered, welded, or otherwise fixed in one end of element 10 and an electrically conductive tube 12 is fixed in a like manner in the other end.

A blower 13 introduces a gas, which may be air, through tubes 14 and 15 to tube 12. A section of nonconductive tubing 16 may be used to electrically insulate element 10. Between tubes 14 and 15 there is disposed a chamber 17 containing means responsive to the amount of gas forced into element 10. As shown, this means consists of a pivotally mounted flap 18 having an arm 19 external to chamber 17 connected thereto. The gravity biased flap 18 is deflected and pivoted upward according to the amount of gas forced past it by blower 13. Arm 19 operates a variable resistor 20 which is connected in series between current source 21, tube 12 and plug 11 by leads 22, 23, and 24. A low voltage, high amperage D.C. power source 21 is desirable, but modifications may be made according to well known laws.

As current source 21 heats element 10, gas from blower 13 passes through its porous tubular wall. The large surface area presented to this gas within the pores of element 10 ensures the gas being heated to substantially the temperature of element 10. By adjusting the flow of a given gas being heated and the power input to element 10, the gas may be heated to any desired temperature within the limits of the material of element 10.

Figure 2:
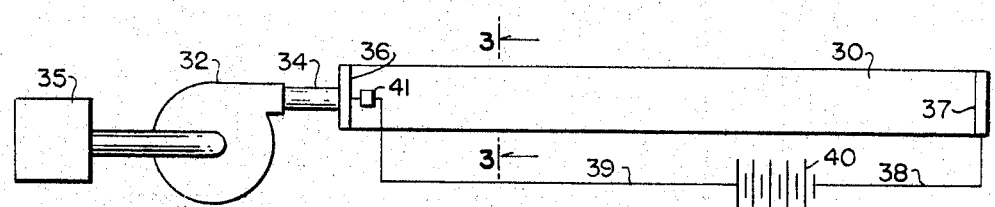
FIGURE 2 is a front view of a home air heater.
Figures 3, 4:
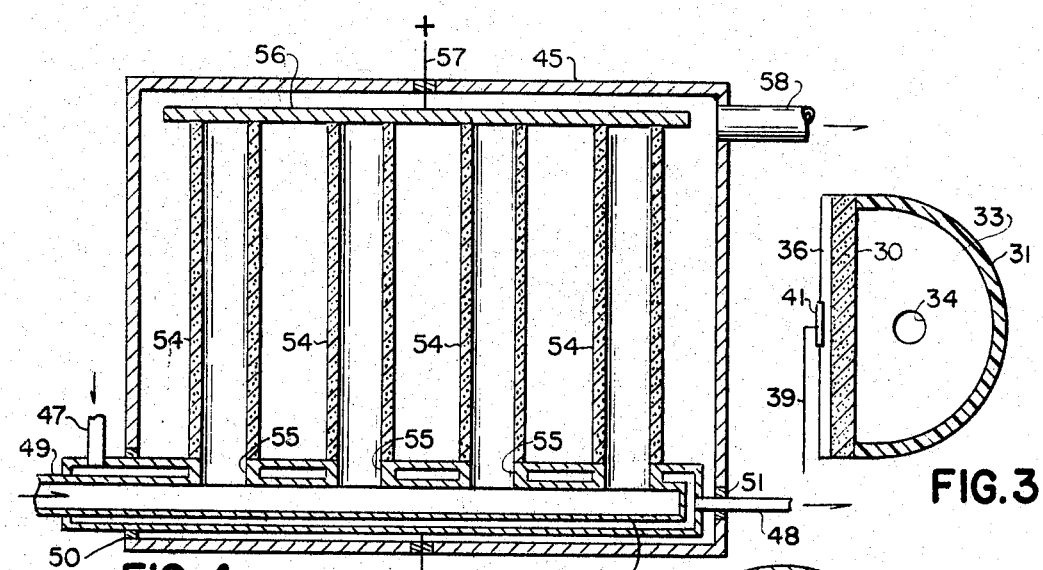
FIGURE 3 is a section taken on line 3—3 of FIGURE 2.
FIGURE 4 is a longitudinal vertical section through an ammonia disassociator according to one embodiment of this invention.

FIGURES 2 and 3 show a first use for this invention in safe home heating. A porous metal heating element 30 is glued or otherwise bonded to a plastic channel 31. Air is forced at a given rate by blower 32 through tubing 34 and end wall 33 of channel 31. To prevent element 30 from having its pores plugged by dust or other foreign matter, the air entering blower 32 should pass through a filter 35.

Element 30 has two electrical contacts 36 and 37 soldered or welded to its ends. Leads 38 and 39 connect a current source 40 to the contacts 36 and 37. A block 41 of low melting electrically conductive metal, such as Rose metal, is fixed to contact 36 and has lead 39 connected to it. Block 41 is disposed close to the heating element 30 to fuse and disconnect the power source 40 from it should element 30 rise above a desired safe temperature. This home air heater is designed to present a porous metal heating element 30 which is only heated to a safe temperature of about 150° F. With the proper design the volume of air passed through element 30 and the power supplied to it are balanced so that the heating element 30 will not exceed this desired safe temperature. The great internal surface area of the pores of element 30 heat air passing through it to this desired temperature without any danger of fire should inflammable articles be dropped on it and without any danger of burns should it be touched.

FIGURE 4 shows this invention used in an ammonia disassociator. A metal container 45 is entered by the water jacketed manifold 46. Cooling water enters manifold 46 through pipe 47 and leaves it through pipe 48. Ammonia gas enters manifold 46 at 49. Insulators 50 and 51 electrically insulate manifold 46 which is connected to lead 52. A number of porous heating elements 54 of 80% nickel and 20% chromium powder are formed as tubes and soldered over openings 55 in manifold 46. The upper ends of the elements 54 are closed by the electrically conductive plate 56 which is fixed oved them and connected to lead 57.

The flow of ammonia gas into manifold 46 is regulated according to the power fed through leads 52 and 57 to heat the ammonia passing through the pores of these elements 54 to about 1750° F. The chromium in the heating elements 54 does not prevent the nickel from acting as a catalyst for disassociating the ammonia into hydrogen and nitrogen gases for well known industrial uses such as providing a reducing atmosphere for the heat treatment of metals. The hydrogen and nitrogen gases pass from container 45 through pipe 58.

This ammonia disassociator has many advantages. It will last indefinitely as its catalytic heating element is only heated in a reducing atmosphere. The greater surface area of the catalyst presented within the pores of the heating elements 54 allows greater disassociation at lower temperatures or a more efficient disassociation at a given temperature. The unit is very compact, small, and light for a given capacity. There is less waste heat as the heat is only generated where used. Further, power may be metered according to gas flow so power is only used as required.

Figures 5, 6:
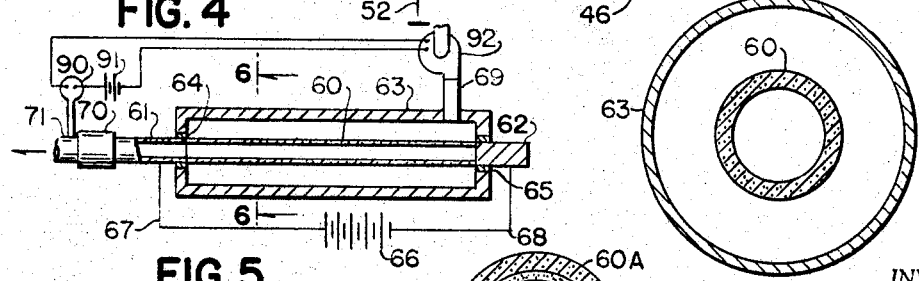
FIGURE 5 is a longitudinal vertical section through a simple ammonia disassociator according to a second embodiment of this invention.
FIGURE 6 is a transverse section taken on line 6—6 of FIGURE 5.

FIGURES 5 and 6 show an even simpler ammonia disassociator. A porous metal heating element 60 is formed into a tube which has a metal tube welded to one end and a rod 62 welded to the other end. A tubular jacket 63 is fixed about element 60 and is electrically insulated from it by the insulators 64 and 65. A power source 66 is connected to tube 61 and rod 62 by leads 67 and 68. Ammonia enters jacket 63 through tube 69, passes inwards through the walls of element 60 to become disassociated, and leaves the disassociator through tubes 61, 70, and 71. Tube 70 may be an electric insulator. If it is desired for heat insulation, sand or other inert material may be packed between element 60 and jacket 63. The inward flow of gas through element 60 where it is heated tends to keep the jacket 63 cooler so that a thinner walled and less expensive jacket 63 may be used.

FIGURE 5 further shows that any well known heat sensing control 90 may respond to the temperature of the heated gases emerging from the device of this invention to control the volume of gases being passed through the heating element by a motor driven pump 92 driven by a power source 91. Thus this invention teaches the controlled heating of a gas passing through a heating element by varying the flow of gas through the heating element while the power supplied to the heating element remains constant. As has been described in connection with FIGURE 1, this invention also teaches the controlled heating of a gas passing through a porous heating element by varying the power supplied to the element.

Figure 7:
FIGURE 7 is a transverse section taken through a tubular porous metal heating element containing a metallic catalyst.

FIGURE 7 shows a heating element 60A which may be used as described in the device shown in FIGURES 5 and 6. The porous metal resistance heating element 60A contains a cylindrical non-conducting porous ceramic container 80. Balls 81 of a catalyst, pure nickel in the case of an ammonia disassociator, are held within container 80 to be heated by gas passing therethrough while being electrically insulated from element 60A. The insulating container 80 allows the use of any electrically conductive metallic catalyst in the gas heating element of this invention to carry out other chemical reactions, As one example of this invention, a powder of 80% nickel and 20% chromium of 100 mesh size particles was compacted to a density of 50% and sintered to form a tube ¼ inch outside diameter, ³⁄₁₆ inch inside diameter, and 8 inches long. 70 amperes at 6 volts generates sufficient heat to warm a considerable volume of air passed through the tube to a temperature of over 1,000° F. Quantitative measurements have yet to be made.

The great surface area exposed in the pores of the porous heating element of this invention may be roughly calculated to be as high as thirty times that of a given surface area of an element if the element is more than ten times thicker than the powder grain size from which it was formed. The intimate contact made by a gas in the pores with this great area ensures rapid and almost 100% heat transfer to the gas.

While many shapes of heating elements may be made, a tubular heating element is preferred as it ensures a uniform flow through its wall to minimize hot spots or cold areas. Many resistors besides nickel-chrome may be used to form the elements of this invention. These include molybdenum, the non-metallic silicon carbide, and others. The grain size and the porosity may be varied according to different applications.

While this invention has been shown and described in the best forms known to me, it will nevertheless be understood that these are purely exemplary and that modifications may be made without departing from the spirit and scope of the invention except as it may be more limited in the appended claims wherein I claim:

1. In a catalytic reaction device, a jacket, a tubular porous resistance heating element disposed within and electrically insulated from said jacket with one end of said tubular element communicating with the outside of said jacket, a current source connected to the ends of said resistance heating element, means forcing a gas into said jacket to pass inward through the tubular porous heating element, and an electrically insulated metallic catalyst within said tubular porous heating element, said catalyst being heated by gas having passed through said tubular porous heating element.

2. The combination according to claim 1 with the addition of a porous insulating cylindrical container within said tubular heating element containing and electrically insulating said metallic catalyst.

References Cited

UNITED STATES PATENTS

| | | | |
|---|---|---|---|
| 1,124,347 | 1/1915 | Snelling. | |
| 1,193,799 | 8/1916 | Landis | 23—288 |
| 1,923,865 | 8/1933 | Handforth | 23—288 X |
| 1,925,784 | 9/1933 | Williams. | |
| 2,013,707 | 9/1935 | Williams | 23—288 |
| 2,264,693 | 12/1941 | Gier | 23—288 |
| 2,454,511 | 11/1948 | Heymann et al. | |
| 2,461,636 | 2/1949 | Gaylor. | |
| 2,837,623 | 6/1958 | Judson et al. | 219—374 X |

JOSEPH SCOVRONEK, Primary Examiner

U.S. Cl. X.R.

23—281; 219—373, 374; 338—224